Figure 1:
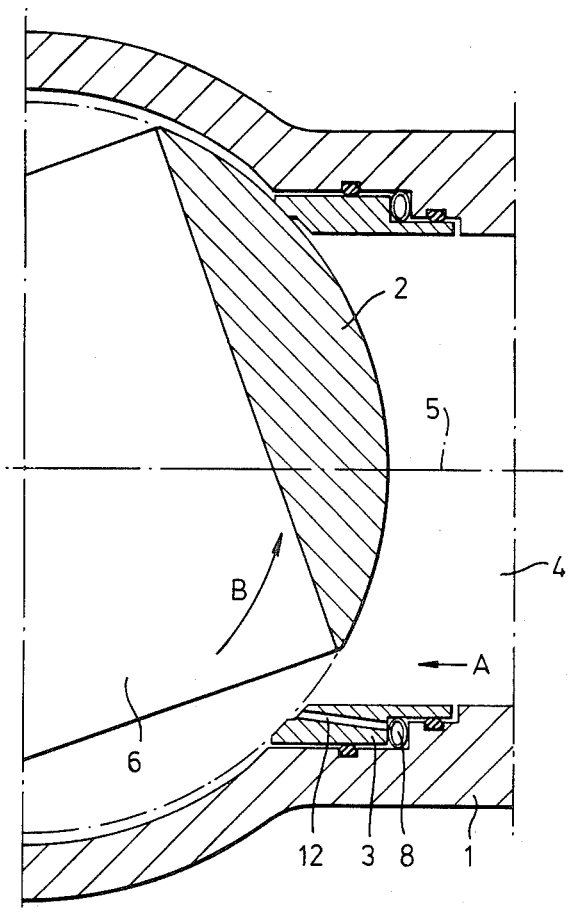

United States Patent [19]

Kivipelto et al.

[11] Patent Number: 4,747,578
[45] Date of Patent: May 31, 1988

[54] ROTARY VALVE WITH PRESSURE URGED SEALING MEMBER

[75] Inventors: Pekka J. Kivipelto, Helsinki; Esko T. Yli-Koski, Kerava, both of Finland

[73] Assignee: Neles OY, Helsinki, Finland

[21] Appl. No.: 898,399

[22] Filed: Aug. 20, 1986

[30] Foreign Application Priority Data

Sep. 4, 1985 [FI] Finland ................................. 853399

[51] Int. Cl.$^4$ ............................................. F16K 5/20
[52] U.S. Cl. .................................... 251/159; 251/172; 251/174; 251/175; 251/315
[58] Field of Search ............... 251/159, 172, 175, 315, 251/174

[56] References Cited

U.S. PATENT DOCUMENTS

| | | | |
|---|---|---|---|
| 3,118,650 | 1/1964 | Cooper | 251/172 |
| 3,266,769 | 8/1966 | Shaud | 251/172 |
| 3,378,026 | 4/1968 | Oliver | 251/172 X |
| 4,135,545 | 1/1979 | Fowler | 251/315 X |
| 4,477,055 | 10/1984 | Partridge | 251/315 X |

FOREIGN PATENT DOCUMENTS 0128685 12/1984 European Pat. Off. ............ 251/315

Primary Examiner—Martin P. Schwadron
Attorney, Agent, or Firm—Cushman, Darby & Cushman

[57] ABSTRACT

A valve consisting of a housing (1) provided with a flow-through passage (4), of a closing member (2) having the shape of a rotational body or part of a rotational body and provided with an aperture (6), and turnably disposed in said flow-through passage, and of a sealing member (3) disposed between the closing member and the housing. Between the sealing member (3) and the housing (1) has been arranged an intermediate space (8) in which when the valve is in closed position prevails a pressure urging the sealing member against the closing member (2). From said intermediate space (8) leads a passage (12) to a point close to that portion of the sealing member (3) adjacent to which an aperture communicating with the flow passage is first established when the valve is being opened.

6 Claims, 2 Drawing Sheets

ROTARY VALVE WITH PRESSURE URGED SEALING MEMBER

The present invention concerns a valve consisting of a housing provided with a flow-through passage, of a closing member shaped as a rotational body or part of a rotational body, turnably disposed in the flow-through passage and provided with an aperture, and of a sealing member disposed between said closing member and said housing.

The object of the invention is to provide a tightly closing spherical valve appropriate for use in control and which is free of friction contact between the sphere and the seal in the sphere's control position. As a consequence, the sealing surfaces of the seal and of the sphere are not subject to wear during control. The valve's need of operating moment is significantly less than in existing valves of equivalent type, and in the present valve relief of the seal and its detachment from the surface of the sphere are automatically accomplished by an ejector phenomenon arising from the velocity increase of the flowing fluid.

The good flow and closing properties of a spherical valve are well known. This is why the use of this valve as a shut-off valve is common. The use of spherical valves as control valves has also become increasingly general all the time. In addition to good flow characteristics, the valve presents good control characteristics, and furthermore the valve is mostly well-sealing as well, which is not true for conventional control valves. When the control valve is tightly closing, no separate shut-off valve is required in the control circuit.

The force, or moment, requirement of a good control valve should be low so that the actuating means might not become bulky and slow. This requirement has the consequence that spherical valves, in which the sphere is urged by pressure effect against the seal abutting on the housing, are only employed in control applications in small sizes. The moment requirements of valves of this type increase rapidly owing to increase of the friction radius, that is, the diameter of the sphere.

Tightly closing spherical valves for control use are frequently of such design that the sphere has been turnably carried in bearings and the sphere seal is movable in the housing in the direction of the flow passage under effect of a spring and of pressure, against the sphere.

The drawback encumbering a tight-closing spherical valve of this type is the continuous friction of the sphere seal against the sphere in the control position of the valve, i.e., when the sphere is in a partially opened position. On the incoming flow side in particular, the seal is pressed into contact with the sphere by effect of the differential pressure produced in control action. However, the contact is not over the entire sealing area of the seal because the sphere is only partially open. The result is uneven wear of the surfaces, which produces friction and an additional moment, and also leakage in the long run. The increased, uneven friction gives rise to binding in control, by effect of which the actuating means will overshoot and the system may remain in autooscillation when a pneumatic actuating means is employed.

Attempts have been made to eliminate these drawbacks by relieving the contact of the seal by means of mechanical elements which push the seal out of contact with the sphere in control position, or by balancing the hydraulic and spring forces so that the seal is not urged against the sphere. In the latter case the seal is urged with mechanical or hydraulic elements in the closing position against the sphere. The required extra elements involve added manufacturing costs, and added failure tendency, and they make the design cumbersome to service.

In the tightly sealing spherical valve of the invention, the drawbacks mentioned above have been eliminated by detaching the closing seal from the surface of the sphere when the sphere is in a control, or intermediate, position, this being done automatically by utilizing the ejector phenomenon arising from the flow. When the seal does not touch the sphere or touches it occasionally only, the moment requirements in control are low and no detrimental wear is incurred. The valve of the invention is characterized in that between the sealing member and the housing have been provided one or several intermediate spaces in which, when the valve is in its closed position, prevails a pressure urging the sealing member against the closing member and from which one or several passages lead to a point close to that part of the sealing member adjacent to which an aperture communicating with the flow passage is first formed when the valve is being opened.

In the spherical valve of the invention are employed, a sphere turnably carried in a housing and one or two sphere seals, preferably spring-loaded or bellows-loaded, movably disposed in the housing.

The posterior space of the seal is encapsulated with packings, and the posterior space has been connected by one or several passages, or bores, with a point close to the face of the seal against the sphere on the incoming flow side, preferably in a plane which is perpendicular against the sphere's turning axis and lies in the centre of the flow passage leading through the housing.

When the sphere is opened from the closed position, the velocity of the fluid flowing through the gap between the sphere and the sphere seal increases, whereby the pressure in this gap, and through the bore the pressure in the posterior seal space, fails below the pressure in the intermediate space of the valve (the spave between the closing packings in the housing of the spherical valve). The pressure in the intermediate space will then push the sphere seal off the sphere in the direction of lower pressure towards the posterior seal space.

Figure 2:
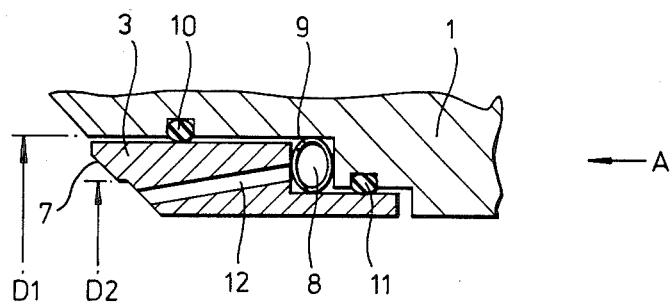
Figure 3:
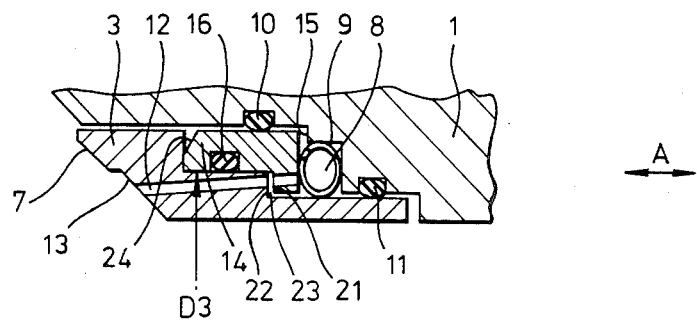
Figure 4:
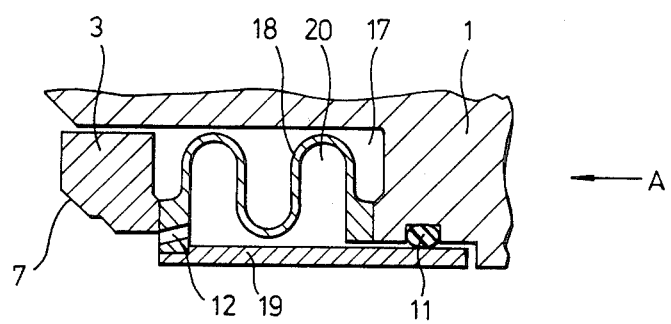

The invention and its details are more closely described in the following, referring to the attached drawings, wherein:

FIG. 1 presents a valve according to the invention, provided with a single-action seal, as viewed in axial direction and sectioned through the centre of the flow passage, In FIG. 2 are shown the components of the seal of FIG. 1, viewed in the direction opposed to that of FIG. 1, FIG. 3 illustrates a detail of a double-action seal in a valve according to the invention, and FIG. 4 shows a detail of a single-action bellows seal in a valve according to the invention.

Referring now to FIG. 1, in this figure are presented details of the valve housing, of the sphere 2 serving as closing member, and of the annular sphere seal 3. The figure depicts a section which is at right angles against the turning axis of the sphere, viewed from the direction of the outgoing shaft, i.e., most usually from above, and sectioned at the height of the flow aperture centre-line, i.e., at the major circle, or main circle. The housing has for flow aperture a passage 4, the centre-line of this passage being indicated with reference numeral 5. The direction of flow is indicated with arrow A. The sphere is pierced by an aperture 6, and the sphere is rotatable about an axis perpendicular against the plane of the drawing; rotation in the direction of arrow B opens the valve.

The housing 1 features a cylindrical recess of which the diameter is D1 and in which the sphere seal 3 has been placed. The sphere seal 3 has an annular sealing face 7, which lies against the sphere in the closed position. The rear portion of the sphere seal carries a shoulder so that between it and a shoulder in the housing is defined an annular posterior space 8, in which a spring 9 has been disposed. On either side of the posterior space packings 10 and 11 have been provided, for instance O-rings, which seal the posterior space against the intermediate space of the valve and the incoming side of the flow passage. A bore 12 leads from the posterior space to a location close to the sealing face 7 in the vicinity of its margin on the incoming side. The bore is preferably located in a plane which is at right angles against the turning axis of the sphere and in the centre of the flow passage leading through the housing. The inner surface of the seal presents beside the sealing face, an annular recess 13 having outer diameter D2 and into which the bore opens.

When the valve of FIG. 1 is in closed position, the pressure on the incoming side has access through the bore 12 to the posterior space 8 of the sphere seal, where the pressure force produced on the annular pressure area, having outer diameter D1 and inner diameter D2, urges the surface 7 of the seal against the sphere 2. In addition to the fluid pressure, the spring force of the spring 9 also exerts a force on the seal. When one starts to turn the sphere in the direction of arrow B to open it, a gap will first open up between the sphere and the seal on the height of the flow aperture centre-line, i.e., adjacent to the bore 12. The differential pressure between the leading and trailing sides gives rise to a fast flow in the gap, this flow causing suction at the mouth of the bore. As a consequence, the pressure in the posterior space 8 will discharge through said bore, and the pressure in the posterior space falls to a value lower than the pressure in the intermediate space of the valve, acting on the sealing face, which pushes the seal off the sphere. The sphere may hereafter be turned applying a minimal moment because the seal is no longer urged against the sphere.

In FIG. 3 is depicted an alternative application of the invention. The seal therein depicted is double-acting, in other words, the direction of flow in the valve may either be the same as in FIGS. 1 and 2 or the opposite thereof. In addition to the components shown in FIG. 2, the embodiment of FIG. 3 incorporates a slidably disposed sleeve 14 around the sealing ring 3, the end face of this sleeve adjacent to the sphere resting against a shoulder on the sealing ring, and a shoulder 15 having been provided in the housing facing said sleeve's end face facing away from the sphere. The end of the sleeve facing the sphere has been chamfered, whereby a space 24 is defined at that end. Between the sleeve and the sealing ring on the diameter D3 has been provided a packing 16, for instance an O-ring. The diameter D3 is preferably equal to or smaller than D2. An O-ring has been disposed between the sleeve and the housing.

The inner surface of the sleeve features a shoulder 21, and pointing towards this is a shoulder 22 on the sealing ring and between them, a space 23. The bore 12 passes through these shoulders and continues to the posterior space 8 of the sleeve.

When the direction of flow is from right to left in FIG. 3, the seal operates in like manner as the seal of FIGS. 1 and 2. When the direction of flow is from left to right, the pressure to be sealed off, coming from the direction of the intermediate space, is admitted in the closed position to the annular space between the oblique end face of the sleeve 14 and the sealing ring 3, the pressure area of this space having the inner diameter D3 and an outer diameter equalling the outer diameter of the sealing face 7, and it urges the sleeve against the shoulder 15. The sphere seal 3 is then urged in "counter-reaction" into contact with the sphere, and the valve will be tightly sealed in its closed position. When one begins to open the valve, a powerful flow from left to right comes into being at the bore and, as a consequence hereof, the pressure in the posterior space 8 goes down in the embodiment of FIG. 3 as well. The pressure also decreases in the space 23 between shoulders 21 and 22. In addition, a suction effect is produced in the gap encircling the sealing ring, between the sealing ring 3 and the housing, and the pressure also falls in the space 24 against the oblique end face of the sleeve. Relief of the seal is hereby caused.

In FIG. 4 is depicted a single-action seal where a bellows seal has been used instead of the spring 9. Behind the seal ring 3, an annular recess 17 has been machined in the housing, the bellows 18 being disposed in this recess. The end of the bellows seal facing the sphere carries a bore 12, placed as in the embodiments of FIGS. 1 through 3. On the inside of the bellows there is an inner shell 19 mounted with tight fit, on the side of the seal ring 3, to join the bellows 18 and mounted with slide fit in the housing 1. Between the inner shell and the housing has been disposed an O-ring 11. The chamber 20 corresponding to the posterior space 8 is defined between the bellows and said inner shell. The bellows also replaces the packing 10. The seal operates like that depicted in FIGS. 1 and 2.

The invention is not confined merely to the embodiments that have been presented: it may rather vary in different ways within the scope of the claims. Instead of a spherical surface, the shape of the closing member may equally be that of another rotational surface, e.g. cylindrical or conical. The axial section of the convex rotational surface may also be elliptical, for instance.

We claim:

1. A valve comprising a housing (1) provided with a flow-through passage (4), and a closing member having the shape of a rotational body and provided with an aperture (6), and turnably disposed in said flow-through passage, a sealing member (3) disposed between the closing member and the housing (1), and between the sealing member (3) and the housing (1) a space being provided in which, when the valve is in closed position, prevails a pressure urging the sealing member against the closing member (2) and from which space at least one passage is provided which leads to a point close to the sealing face (7) of said sealing member (3) and intermediate said sealing face (7) and said flow-through passage (4), the improvement comprising said rotational body being turnable from a first position wherein said rotational body closes said flow-through passage and a second position wherein said flow-through passage is opened, such that said aperture (6) is cut off from said flow-through passage when said rotational body is in said first position and communication between said aperture (6) and said flow-through passage is established as said rotational body is moved from said first position to said second position, said passage of said sealing member leading to that portion of the sealing member (3) adjacent to which open communication between said aperature (6) and the flow-through passage is first established when the valve is being opened, whereby on opening the valve a flow is produced at the site of said passage of said sealing member, this flow causing suction at the mout of the passage of said sealing member and reducing the pressure in said space so as to be lower than the pressure acting on the sealing surface (7); said space being exposed to fluid pressure only through said passage.

2. Valve according to claim 1, characterized in that the passage, leading from the said space opens at the largest cross section in a plane at right angles against the turning axis of the closing member (2) on that side of the flow passage (4) where the closing member first becomes detached from the seal (3).

3. Valve according to claim 1 or 2, characterized in that the sealing member (3), in the vicinity of which the passage (12) leading from said space opens, is located on the incoming side of the closing member (2).

4. Valve according to claim 1 or 2, characterized in that the sealing member (3), in the vicinity of which the passage (12) leading from said space opens, is located on the trailing side of the closing member (2).

5. Valve according to claim 4, characterized in that between the sealing member (3) and the housing (1), encircling the sealing member (3), has been disposed an axially movable sleeve (14).

6. Valve according to claim 1 or 2, characterized in that said valve has been provided with a spring means which urges the sealing member (3) in the direction towards the closing member (2).

* * * * *